United States Patent

[11] 3,551,776

[72] Inventors David A. Tawfik
 Rego Park, N.Y.;
 Frank J. Thomas, West Paterson; George
 H. Pfersch, Randolph Township, Dover,
 Morris County, N.J.
[21] Appl. No. 764,245
[22] Filed Oct. 1, 1968
[45] Patented Dec. 29, 1970
[73] Assignee The Bendix Corporation
 a corporation of Delaware

[54] TRIPLE REDUNDANT SERVO FLIGHT CONTROL
 INCLUDING DIGITAL RESYNCHRONIZATION OF
 CHANNELS, DETECTION OF FAILED CHANNELS,
 AND VOTED OUTPUT
 11 Claims, 5 Drawing Figs.
[52] U.S. Cl. ................................................ 318/564,
 318/565, 244/77
[51] Int. Cl. .................................................... G05b 11/00
[50] Field of Search ........................................ 318/20-
 —075, 20.080; 244/77

[56] References Cited
 UNITED STATES PATENTS
 3,334,282 8/1967 Wolfe .......................... 318/(20.075)
 3,379,951 4/1968 Franchi et al. ............... 318/(20.075)

Primary Examiner—T. E. Lynch
Attorneys—S. H. Hartz and Plante and Hartz, Smith and Thompson ABSTRACT: A triple redundant system for controlling an aircraft in response to gain-adjusted error signals. Each servochannel includes a separate sensing means for providing voted outputs of the actual and expected response of the aircrafts. These outputs are sampled and the differences in digital form are accumulated in a counter for each channel. A comparison is made between counters and they are resynchronized if necessary and if possible. A failure alarm indicates only if a channel cannot be synchronized for three successive attempts to prevent nuisance disengagements. A voted output of all three channels is provided.

INVENTORS
DAVID A. TAWFIK
GEORGE H. PFERSCH
FRANK J. THOMAS
BY
ATTORNEYS

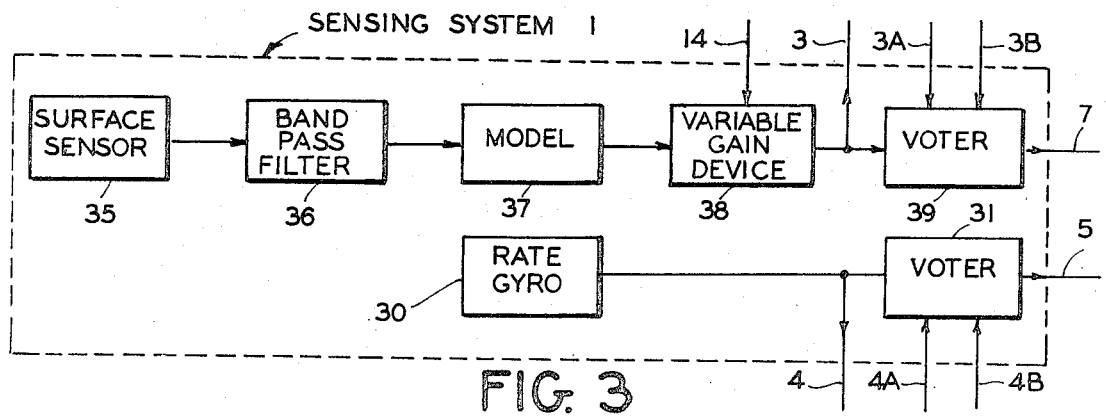
FIG. 3
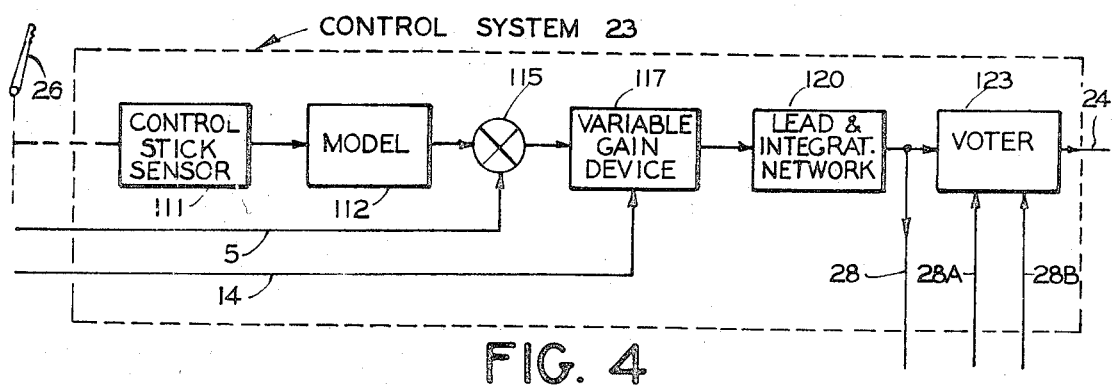
FIG. 4
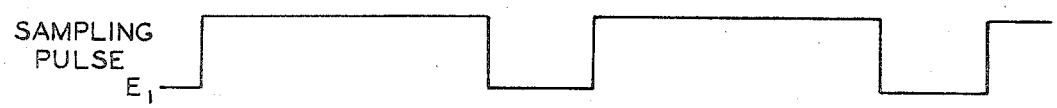
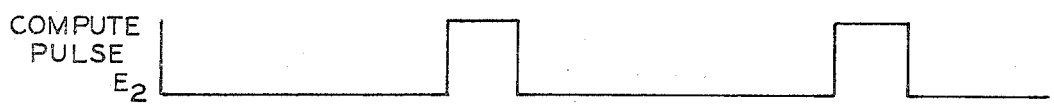
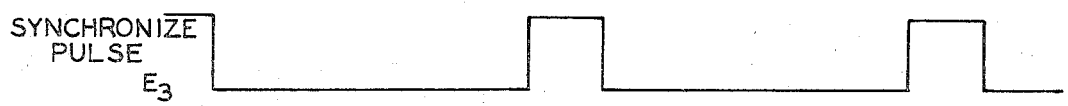
FIG. 5

3,551,776

TRIPLE REDUNDANT SERVO FLIGHT CONTROL INCLUDING DIGITAL RESYNCHRONIZATION OF CHANNELS, DETECTION OF FAILED CHANNELS, AND VOTED OUTPUT

BACKGROUND OF THE INVENTION

1. Field of the Invention

This invention relates to flight control systems and more particularly to a synchronized redundant system for controlling an aircraft in response to synchronized gain-adjusted signals.

2. Description of the Prior Art

Single channel flight control systems, such as the one disclosed in U.S. Pat. No. 3,361,394 granted Jan. 2, 1968, to George Henry Pfersch, and assigner to The Bendix Corporation, were used in controlling an aircraft. A major disadvantage of a single channel system is that a failure in the system results in the loss of the flight control system. It was necessary to increase the reliability of the flight control system to assure increased safety to occupants in the aircraft. A triple redundant flight control system requires that two of the three channels must be in a failed condition simultaneously before loss of the flight control system occurs, thereby increasing the reliability of the flight control system. A problem is encountered in redundant systems in that comparators, having small alarm threshold, monitor analogue circuitry to determine gain change criteria. Slight variations due to analogue circuitry may result in failure indication even though a failure has not occurred. The problem is avoided by synchronizing the digital counters in all the channels of the redundant system, while still permitting independent operation and fault detection in each channel in the event of failures in the other channels.

SUMMARY OF THE INVENTION

The present invention contemplates providing three identical channels for redundant operation applying outputs to a control device, each channel having a sensing system providing a voted output corresponding to the actual response of an aircraft and a voted second output corresponding to the expected response of the aircraft in accordance with the dynamic characteristics of the aircraft. Samplers sample the sensed response and expected response outputs. The samples are applied to summing means which determines the difference between the sensed response and the expected response. A counter responsive to the difference provides a digital output corresponding to the difference. A comparator receives the expected response sample and the difference from the summing means and determines if synchronization of the three channels is necessary. A synchronizing network synchronizes the counter with counters in the other channels when synchronization is required. A failure alarm network in each channel responsive to that channel's synchronizing network provides an alarm when its counter fails to synchronize with the counters of the other channels for three consecutive synchronizing operations. A control system connected to the counter applies a voted output to the control device in response to the count contained in the counter and the manipulation of a control stick which is common to all channels.

One object of the invention is to synchronize the outputs of redundant channels when synchronization is necessary.

Another object of the invention is to determine from the outputs from the sensing system if synchronization is desirable.

Another object of the invention is to vote the outputs of the redundant channels, compare each channel output to the voted output, and signal a failure when the channel output cannot be synchronized with the voted output.

Another object of the invention is to switch between a synchronizing mode of operation and a compute mode of operation.

Another object of the invention is to set the counters in the redundant channels to the same bit level by a fixed voltage level.

Another object of the invention is to provide a three-count trip alarm system for disregarding spurious failure indications.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE DRAWINGS

FIGS. 2, 3 and 4 are block diagrams of the digital gain channel, the sensing system and the control system, respectively, shown in FIG. 1.

FIG. 5 is a timing chart showing the sequence of sampling pulses $E_1$, compute pulses $E_2$, and synchronizing pulses $E_3$.

DESCRIPTION OF THE INVENTION

All elements having numbers with suffixes are connected and operate in the identical manner as elements having corresponding numbers without suffixes. In the interest of simplicity only one channel of the redundant system will be described with references to the other channels as necessary due to the duplication of functions.

Figure 1:
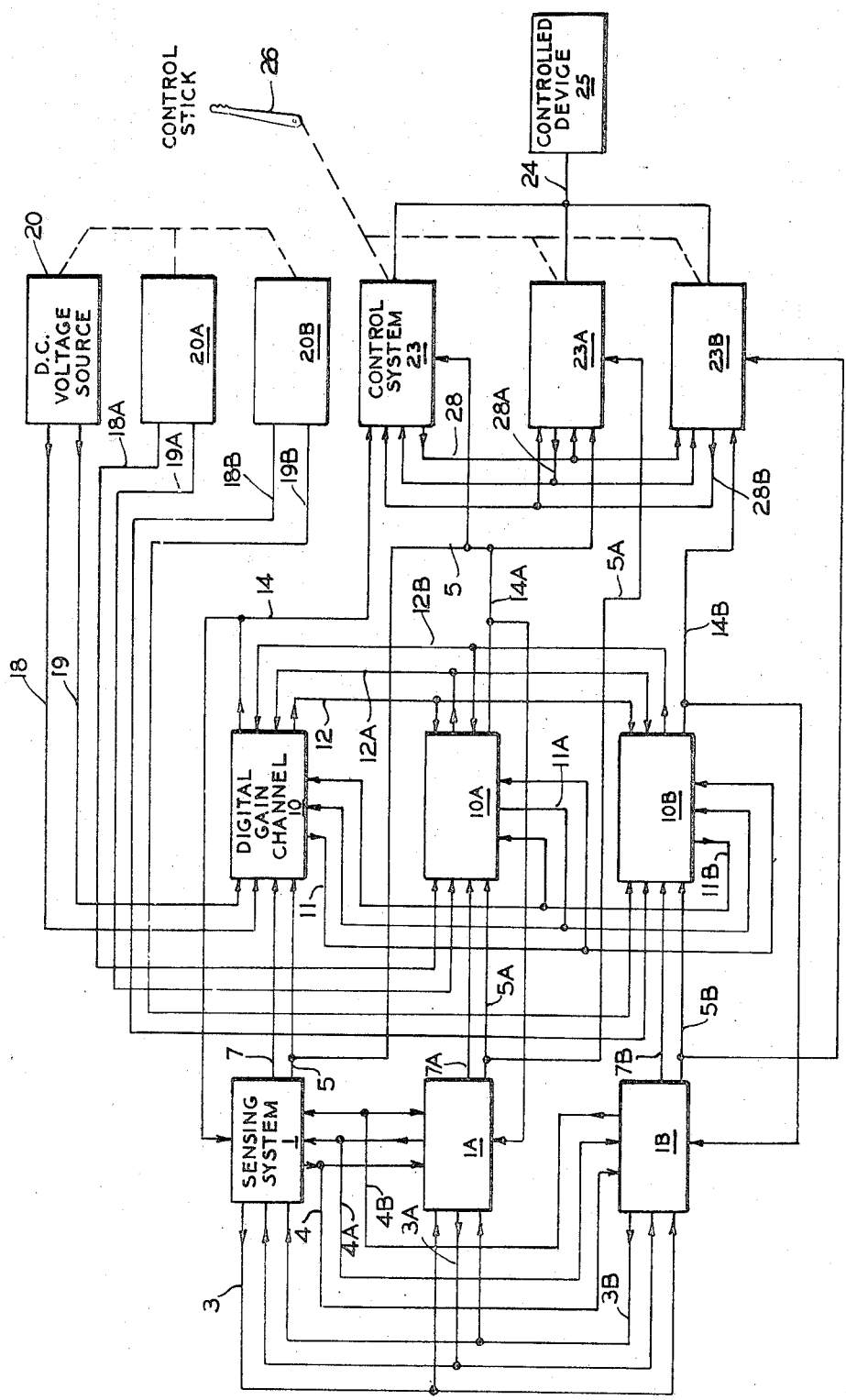
FIG. 1 is a block diagram showing one axis control of a triple redundant flight control system.

Referring to FIG. 1, each channel of the redundant flight control system has a sensing system 1 which senses the response of an aircraft and provides signals corresponding to a sensed response on a conductor 5 and an expected response in accordance with the dynamic characteristics of the aircraft on a conductor 7. Sensing systems 1, 1A and 1B are interconnected by conductors 3, 3A, 3B, 4, 4A and 4B as hereinafter explained. A digital gain channel 10, having input conductors 11A, 11B, 12A, 12B, 18 and 19 and output conductors 11, 12 and 14 is connected to conductors 5 and 7. The conductors 11, 11A, 11B, 12, 12A and 12B interconnect the digital gain channel 10 with the digital gain channels 10A and 10B as hereinafter explained. Conductor 14 is connected to sensing system 1.

A DC voltage source 20 applies either a high level or a low level DC voltage to conductor 18 and a variable amplitude DC voltage to conductor 19. The DC voltage source 20 is mechanically connected to DC voltage sources 20A and 20B so that a pilot of the aircraft simultaneously adjusts all the DC voltage sources 20, 20A and 20B. A control system 23 for controlling the aircraft is connected to the conductors 5 and 14 and is responsive to movement of a control stick 26 as well as outputs from sensing system 1 and digital gain channel 10. Control systems 23A and 23B are also responsive to control stick 26. Conductors 28, 28A and 28B interconnect control systems 23, 23A and 23B as hereinafter explained. A control device 25, which may be a hydraulic actuator for driving a control surface, such as the elevators of the aircraft, receives the outputs from control systems 23, 23A and 23B through a conductor 24.

Referring to FIG. 3, each sensing system 1, 1A or 1B includes a rate gyro 30 mounted on the aircraft which provides a signal to a voter 31 and to conductor 4 corresponding to the actual pitch rate of the aircraft. Voter 31 receives pitch rate signals from gyros in the other channels on conductors 4A and 4B and provides an intermediate pitch rate signal on conductor 5 corresponding to the actual response of the aircraft. A surface sensor 35 provides a DC output corresponding to the position of the control surface. A band pass filter 36 is connected to the surface sensor 35 and provides an output to a model 37. Model 37 is a constant parameter network simulating the dynamic characteristics of the aircraft and having a transfer function corresponding to the expected response of the aircraft.

A variable gain device 38 has inputs connected to an output of model 37 and to conductor 14 and provides an output, to a voter 39 and to conductor 3, related to model 37 output and a signal present on conductor 14. Voter 39 also receives outputs from models in digital gain channels 10A and 10B on conductors 3A and 3B, respectively, and provides an expected response output on conductor conductor 7 corresponding to the intermediate input of the three inputs.

Figure 2:
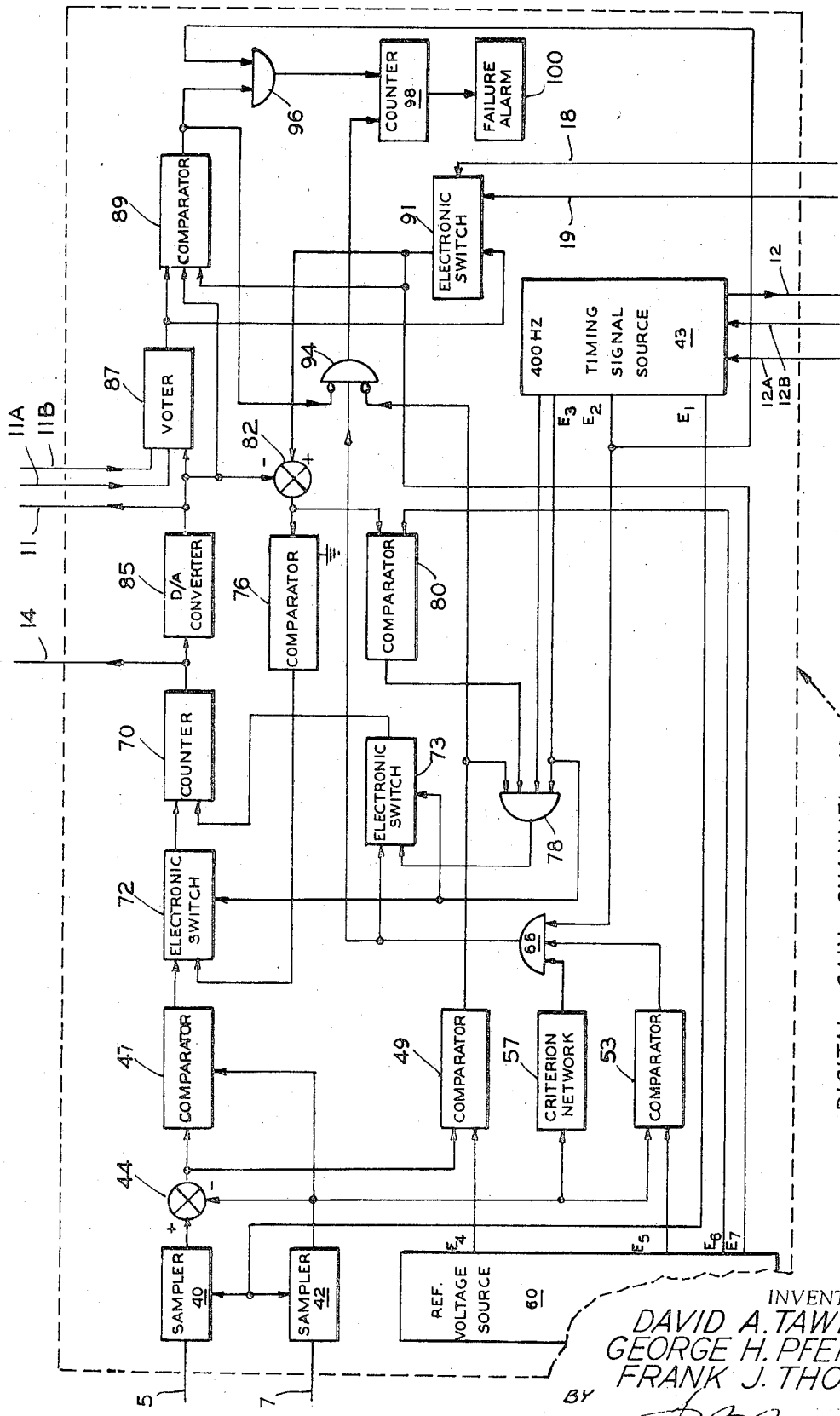

Referring to FIG. 2, each digital gain channel 10, 10A or 10B comprises samplers 40 and 42 connected to output conductors 5 and 7, respectively, of sensing system 1 and to a timing signal source 43 for receiving a sampling pulse $E_1$ as shown in FIG. 5. Due to the operation of the voters in sensing systems 1, 1A and 1B, the samplers in channels 10, 10 10A and 10B will receive the same intermediate signal.

Timing signal source 43, which may be of the type disclosed in Ser. No. 656,499, filed Jul. 27, 1967, now U.S. Pat. No. 3,522,455, by Frank John Thomas and David Abood Tawfik and assigned to The Bendix Corporation, assignee of the present invention, provides the sampling pulse $E_1$, a compute pulse $E_2$ and a synchronizing pulse $E_3$ as shown in FIG. 5 and 400 hertz pulses. Conductors 12A and 12B provide inputs to the timing signal source 43 from timing signal sources in channels 10A and 10B, respectively, while conductor 12 provides an output to the timing sources in channels 10A and 10B so as to synchronize the $E_1$, $E_2$, $E_3$ and 400 hertz pulses with similar pulses appearing in channels 10A and 10B.

The output of sampler 40 is applied to a summing means 44 having an output connected to comparators 47 and 49. The output of sampler 42 is connected to summing means 44, to comparators 47 and 53 and to a criterion network 57.

A reference voltage source 60 provides DC voltages $E_4$, $E_5$, $E_6$ and $E_7$. Comparators 49 and 53 are connected to voltage source 60 and receive DC voltages $E_4$ and $E_5$, respectively. An AND gate 66 receives the outputs from comparator 53 and criterion network 57 and the computing pulse $E_2$ from timing signal source 43.

A counter 70 is connected to electronic switches 72 and 73 for counting the output from electronic switch 73 in a direction up or down as commanded by the output from electronic switch 72. Electronic switch 72 is connected to comparators 47 and 76 and to timing signal source 43 for receiving the synchronizing pulse $E_3$. Electronic switch 73 is connected to AND gates 66 and 78 and to the timing signal source 43 for receiving the synchronizing pulse $E_3$. AND gate 78 is connected to timing signal source 43 for receiving the synchronizing pulse $E_3$ and the 400 hertz pulses, and to comparators 49 and 80 for receiving their outputs.

Comparators 76 and 80 are connected to a ground reference and to reference voltage source 60, respectively, and both comparators are connected to summing means 82 for comparing the output from summing means 82 to the ground reference and the DC voltage $E_6$.

The output from counter 70 is applied through conductor 14 to control system 23 and sensing system 1 for affecting the control of the aircraft in response to the count contained in the counter 70 as hereinafter explained. The output from counter 70 is also applied to a digital-to-analog converter 85. Converter 85 output is applied to summing means 82, to a voter 87, to a comparator 89 and through conductor 11 to voters in digital gain channels 10A and 10B. Inputs to voter 87 are also connected to conductors 11A and 11B for receiving the outputs from digital-to-analog converters in digital gain channels 10A and 10B, respectively.

The output from voter 87 is applied to comparator 89, which is also connected to voltage source 60 and receives DC voltage $E_7$, and to an electronic switch 91 having inputs connected to conductors 18 and 19 which in turn are connected to the DC voltage source 20.

The output of electronic switch 91 is connected to a second input to summing means 82. Switch 91 will apply the output from voter 87 to summing means 82 during the presence of a low level DC voltage on conductor 18 and apply the variable amplitude DC voltage to summing means 82 while a high level DC voltage is present on conductor 18.

Comparator 89 is a double-ended comparator which determines if a difference exists between the output from voter 87 and the output from converter 85. A voltage corresponding to the difference if any, is compared to the DC voltage $E_7$. Comparator 89 provides a low level DC output if the difference voltage is less than DC voltage $E_7$ and a high level DC output if the difference voltage is greater than DC voltage $E_7$. The output of comparator 89 is connected to an inverting input to AND gate 94 and to an input to AND gate 96.

AND gate 94 has an input connected to the output of AND gate 66 and an inverting input connected to the output of the comparator 49. AND gate 96 has a second input connected to timing signal source 43 for receiving the computing pulse $E_2$. An alarm counter 98 has one input connected to AND gate 96 for counting the output from AND gate 96 and a second input connected to AND gate 94 to be reset by its output. Alarm counter 98 provides an output when it contains a count of three. A failure alarm 100 is connected to the output of counter 98 for providing an alarm in response to the output from counter 98.

Referring to FIG. 4, the control stick 26 under the manual control of the pilot causes a control stick sensor 111 to provide an output, corresponding to the position of the control stick 110, which is applied to a model 112. Model 112 is a constant parameter network simulating the dynamic characteristics of an ideal aircraft and has a transfer function corresponding to desired aircraft response. The output of model 112 is applied to a summing means 115 with the output from voter 31 present on conductor 5. Summing means 115 applies an output to a variable gain device 117 which also receives the output from the counter 70 on conductor 14. The gain of the variable gain device 117 is the reciprocal of the gain of the variable gain device 38 so that the devices 38 and 117 together provide a constant gain. A lead and integrating network 120 is connected to variable gain device 117 and corrects for long term errors in pitch displacement and provides an output to a voter 123 and through conductor 28 to voters in digital gain channels 10A and 10B. Voter 123 also receives outputs from the other lead and integrating networks in digital gain channels 10A and 10B on conductors 28A and 28B, respectively, and provides an output, corresponding to the intermediate input of the three inputs, to the control device 25 for operating the control surface.

OPERATION

Referring to FIG. 4, manipulation of the control stick 26 causes control stick sensor 111 to provide a pitch command signal to model 112 which differentiates the signal in accordance with the simulated dynamic characteristics of the aircraft and provides an output corresponding to a desired pitch rate.

Referring to FIG. 3, rate gyro 30 senses the pitch of the aircraft and applies an output corresponding to the actual response of the aircraft to voter 31 and to voters in digital channels 10A and 10B through conductor 4. Voter 31 provides an actual response output on conductor 5 corresponding to an intermediate input of the inputs from the rate gyros in sensing systems 1, 1A and 1B.

Sensor 35 senses the position of the control surface and applies an output corresponding thereto to filter 36. Filter 36 differentiates the output and provides a signal corresponding to a control surface rate which is applied to model 37. Model 37 differentiates the signal from filter 36 in accordance with the dynamic characteristics of the aircraft and provides an output to variable gain device 38. Variable gain device 38 amplifies the output from the model 37 in accordance with the output from counter 70 present on conductor 14 and applies an output to voter 37 and to voters in digital gain channels 10A and 10B through conductor 3. Voter 39 provides an expected response output on conductor 7 corresponding to the intermediate input of the inputs from the models in sensing systems 1, 1A and 1B.

Referring to FIG. 2, samplers 40 and 42 provide simultaneous pulse outputs to summing means 44 corresponding to the sensed and expected response outputs on conductors 5 and 7, respectively, from sensing system 1 in response to a sampling pulse $E_1$, from timing signal source 43. Summing means 44 provides a voltage corresponding to the difference between the sensed response and the expected response to comparators 47 and 49.

Comparator 47 compares the difference voltage with the output from sampler 42 to determine the counting direction of the counter 70 during a computing mode of operation. The output from comparator 47 is applied to electronic switch 72. Due to the absence of synchronizing pulse $E_3$ from timing signal source 43, electronic switch 72 applies the output from comparator 47 to the counter 70 causing it to count either up or down as determined by the output from comparator 47.

Comparator 49 compares the difference output from summing means 44 with the predetermined voltage $E_4$ from reference voltage source 60 to determine if synchronization is necessary. Comparator 49 provides a low level DC voltage when the difference output from summing means 44 is greater than $E_4$ indicating that the difference output is not sensitive to individual channel bias and therefore synchronization of counter 70 with the counters in digital gain channels 10A and 10B is not desirable. The low level DC voltage from comparator 49 disables AND gate 78 thereby preventing synchronization and partially enables AND gate 94 since the inverting input of AND gate 94 inverts the low level voltage to a high level. When synchronization is not necessary, the counters in channels 10, 10A and 10B have the same count, provided that none of the channels have failed, so that comparator 89 has a low level DC output which fully enables AND gate 94. The next pulse from AND gate 66 passes through AND gate 94 and resets counter 98. If a channel has failed, synchronization is prevented. Comparator 89 enables AND gate 96 and after three compute pulses $E_2$ to pass through AND gate 96 to counter 94, counter 98 will provide an output to failure alarm 100 which provides an indication of failure.

The pulse output corresponding to the expected condition of the aircraft from sampler 42 is also applied to criterion network 57 and to comparator 53, which receives the voltage $E_5$ from reference voltage source 60. Criterion network 57 stores a preceding pulse from sampler 42, compares a present pulse from sampler 42 with the stored pulse and provides a pulse output to the AND gate 66 when the difference between the stored pulse and the present pulse exceeds a predetermined minimum. Comparator 53 compares the output from sampler 42 to DC voltage $E_5$ representing a minimum amplitude in order to avoid noise problems and provides a high level DC voltage which partially enables AND gate 66.

When the criterions established by criterion network 57 and comparator 53 are met, AND gate 55 is fully enabled for the duration of the pulse from the criterion network 57. The compute pulse $E_2$, provided by timing source 43, passes through the AND gate 110 and is applied to electronic switch 73 while the sampling pulse $E_1$ is still present, as shown in FIG. 5.

Electronic switch 73 passes the compute pulse $E_2$ to counter 70 in the absence of a synchronizing pulse $E_3$ from timing source 43. Counter 70 changes its count in response to the compute pulse $E_2$ in the direction indicated by the output from the electronic switch 72.

A digital output corresponding to the count from counter 70 is applied to the control system 23 through the conductor 14, as shown in FIG. 1, for controlling the aircraft in response to the sensed condition and the expected response. Referring to FIG. 4, the output corresponding to the desired pitch rate model 112 is applied to summing means 115 with the sensed response output from voter 31 present on conductor 5. Summing means 115 applies an error signal corresponding to the difference between the desired pitch rate and the sensed pitch rate to the variable gain device 117 which is responsive to the output of counter 70 present on conductor 14. The variable gain device 117 provides a gain-adjusted error signal to lead and integrating network 120 which corrects for long term errors in pitch displacement and provides a control signal to voter 123. Voter 123 receives inputs from the other lead and integrating networks in digital gain channels 10A and 10B on conductors 28A and 28B and provides an output corresponding to an intermediate input of the three inputs to control device 25. Control device 25 manipulates the control surface in response to the signals from voter 123 and the voters in the digital gain channels 10A and 10B.

After the termination of the sampling pulse $E_1$ and the compute pulse $E_2$, the synchronizing pulse $E_3$ appears time-related to the other pulses as shown in FIG. 5. Since the outputs of sensing system 1 are no longer sampled due to the absence of the sampling pulse $E_1$, comparator 49 provides a high level DC voltage which partially enables AND gate 78 and disables AND gate 94.

The count in counter 70 from the compute operation is applied to the digital-to-analog converter 85. Converter 85 provides an analogue output, corresponding to the count in counter 70, to voter 87, to comparator 89 and to summing means 82 and to the voters in digital gain channels 10A and 10B through conductor 11.

Voter 87 also receives inputs, on conductors 11A and 11B, from the digital-to-analog converters in channels 10A and 10B, respectively, corresponding to the counts in the counters in those channels. Voter 87 applies an output, related to the intermediate count of the three counters, to the comparator 89 and to electronic switch 91. Comparator 89 determines the difference between the output from converter 85, corresponding to the count in counter 70, with the output from voter 87 corresponding to the intermediate count of the three counters and compares the difference to the voltage $E_7$ from reference voltage source 60. If the difference is greater than the DC voltage $E_7$, comparator 89 provides a high level DC output which enables AND gate 96. A next compute pulse $E_2$ applied to the enabled AND gate 96 causes AND gate 96 to have a pulse output which is counted by the counter 98. The high level DC output of the comparator 89 is inverted by the inverting input to AND gate 94 thereby disabling AND gate 94 and preventing the alarm counter 98 from being reset while a difference between the count in counter 70 and the intermediate count that is greater than DC voltage $E_7$ exists. Alarm counter 98 does not trigger failure alarm 100 until three consecutive efforts to synchronize the count of counter 70 with the intermediate count have failed.

Electronic switch 91 passes the output of voter 87, corresponding to the intermediate count, to summing means 82 when the DC voltage on conductor 18 is at a low level.

Summing means 82 determines the difference between the voltage corresponding to the intermediate count and the from the converter 85 corresponding to the count in the counter 70 and applies an output corresponding to the difference to comparators 76 and 80. Comparator 76 determines whether counter 70 should count up or down while as determined by a comparison of the output from summing means 82 with a grounded reference. The output from comparator 76 is applied to electronic switch 72 controlling the counting direction of the counter 70 as heretofore explained. Counter 70 will then count the output from AND gate 78 in the direction determined by comparator 76. The comparator 80 compares the output from summing means 83 82 with the DC voltage $E_6$ from the reference voltage source 60 to determine if the difference exceeds a threshold level and if the difference does exceed the threshold level then synchronization occurs. When the difference is above the threshold level, comparator 80 applies a high level DC output to the AND gate 78 partially enabling it.

The AND gate 78, which is partially enabled by the outputs of comparators 49 and 80 as heretofore explained, is totally enabled by the synchronizing pulse $E_3$ from timing source 43 for the duration of that pulse. The width of pulse $E_3$ is such that four of the 400 hertz pulses from the timing source 43 can be passed while the pulse $E_3$ enables AND gate 78. The output from the AND gate 78 is applied to the switch 73 which passes the output in response to the synchronizing pulse $E_3$. The output of AND gate 78 enters counter 70. The counter 70 changes its count in accordance with the output from AND gate 78, so that the counter 70 actually alters the count according to the difference between the count corresponding to the output of the sensing system 1 and the intermediate count of the three digital gain channels 10, 10A and 10B as determined by the voter 87. When synchronization is achieved the output of the converter 85 is equal to the output of voter 87 causing the summing means 82 to have a zero output. The zero output causes the comparator 80 to have a low level DC output which disables AND gate 78 thereby preventing the passage of the 400 hertz pulses on the conductor 93 and hence preventing changing of the count by the counter 70. The comparator 89 has a low level DC output when synchronization is achieved thereby disabling AND gate 96 thus preventing the next compute pulse $E_2$ from being counted by the alarm counter 98. When synchronization is achieved, the low level DC outputs of comparators 49 and 89 are inverted to high level DC voltages by the inverting inputs, thereby enabling AND gate 94 so that a next pulse from AND gate 66 during the compute operation will reset the alarm counter 98 thus requiring the three consecutive failures of efforts to synchronize the counter 70 before an output is applied by alarm counter 98 to the failure alarm 100. Termination of the synchronizing pulse $E_3$ terminates the synchronizing operation.

Referring to FIGS. 1 and 2, a high level DC output present on the conductor 18 from the DC voltage source 20 causes electronic switch 91 to pass the DC output from the DC voltage source 20 present on conductor 19. Summing means 82 determines the difference between the output form DC voltage source 20 and the output from converter 85 corresponding to the count contained in counter 70. The output from summing means 82 acts in conjunction with comparators 76 and 80, AND gate 78 and electronic switches 72 and 73 to change the count in counter 70 in the manner heretofore described during the synchronizing operation until the count corresponds to a fixed gain related to the DC voltage level present on conductor 19 whose level is controlled by the pilot.

The present invention determines if synchronization of the redundant channels is required, accomplishes synchronization when synchronization is required, signals a failure when synchronization cannot be achieved after three attempts to synchronize thus avoiding spurious indication of failure, and changes the gain state of the channels by changing the counters to the same count corresponding to a desired gain state.

It should be noted that the use of voters 31, 39, 87 and 123 in digital gain channel 10 and similar voters in other channels provide multiple redundancy in the form of 27 signal paths. Unless two failures occur in sensing systems 1, 1A and 1B; or digital gain channels 10, 10A and 10B; or control system 23, 23A and 23B, then it would be necessary to have failures in four of the aforementioned elements before the system would be rendered inoperative.

While several embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

We claim:

1. A redundant control system comprising a plurality of control channels each having means for providing a control signal, each channel having voter means responsive to the control signals from all the channels for selecting one of the control signals when the control signals from the several channels are of different values, a each a channel having comparing means connected to the control signal means and to the voter means for comparing the channel control signal with the selected control signal and providing an output when the signals are of different values, each channel having means connected to the control signal means and to the comparing means for periodically changing the value of the channel control signal in accordance with the output from the comparing means to equalize the channel control signal with the selected control signal and including a source of timing pulses and switching means connected to the source of timing pulses, to the control signal means and to the comparing means for passing the timing pulses to the control signal means in response to an output from the comparing means causing the channel control signal to change in accordance with the number of timing pulses passed.

2. A redundant control system as described in claim 1 having a controlled device connected to the voter means of each channel and responsive to the selected control signal.

3. A redundant control system as defined in claim 1 in which the comparing means includes summing means connected to the control signal means and to the voter means for providing an output corresponding to a difference between the channel control signal and the selected control signal, and a comparator connected to the summing means, to a ground reference and to the changing means for providing an output to the changing means causing the changing means to change the channel control signal in one direction when the output from the summing means is greater than the ground reference and to change the channel control signal in an opposite direction when the output of the summing means is less than the ground reference.

4. A redundant control system as defined in claim 1 further comprising a source of variable reference voltage, means connected to the reference voltage source for selecting a value of reference voltage, means for providing a command signal, and switching means connected to the control signal means, to the changing means to the reference voltage source, and to the command signal means for passing the reference voltage to the control signal means instead of the output from the changing means in response to the command signal so that the value of the channel control signal can be changed in accordance with the selected value of the reference voltage.

5. A redundant control system as defined in claim 1 further comprising means connected to the control signal means and to the switching means for preventing changing the channel control signal to equal the selected control signal when equalization of the signals would mask a failure in the control signal means.

6. A redundant control system as defined in claim 1 further comprising means connected to the control signal means and to the changing means for preventing changing the channel control signal to equal the selected control signal when equalization of the signals would mask a failure in the control signal means.

7. A redundant control system as defined in claim 6 in which the prevention means includes a source of reference voltage and a comparator connected to the control signal means, to the source of reference voltage and to the changing means for providing an output to the changing means which prevents changing of the channel control signal when the value of the channel control signal is greater than the reference voltage.

8. A redundant control system as defined in claim 1 further comprising a source of timing pulses and an alarm system connected to the control signal means, to the voter means, and to the source of timing pulse for indicating failure of the channel control signal to be changed to equal the selected control signal after three consecutive periods.

9. A redundant control system as defined in claim 8 in which the alarm system includes second switching means connected to the comparing means and to the source of timing pulses for passing a timing pulse in between periods when the comparing means provides an output, a counter responsive to passed pulses and providing an output when a count of three is reached, means connected to the comparing means for resetting the counter when the comparing means output is zero, and an alarm responsive to the output from the counter.

10. A redundant control system as defined in claim 1 in which the comparing means has means for providing an output only when the value of the channel control signal and the value of the selected control signal exceeds a predetermined amount.

11. A redundant control system as defined in claim 10 in which the output means include s summing means connected to the control signal means and to the voter means for providing an output corresponding to a difference in value between the channel control signal and the selected control signal, a source of reference voltage, and a comparator connected to the summing means, to the reference voltage source and to the changing means for providing an output to the changing means when the difference output is greater than the reference voltage so as to prevent noise from changing the channel control signal.